(12) United States Patent
Fourney (10) Patent No.: US 7,426,992 B2
(45) Date of Patent: Sep. 23, 2008

(54) SYSTEMS AND METHODS FOR PROVIDING AN IMPROVED TIMING CONVEYOR

(75) Inventor: Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 11/948,528

(22) Filed: Nov. 30, 2007

(65) Prior Publication Data

US 2008/0067038 A1  Mar. 20, 2008

Related U.S. Application Data

(63) Continuation of application No. 11/203,711, filed on Aug. 15, 2005, now Pat. No. 7,311,192.

(51) Int. Cl.
*B65G 17/24* (2006.01)
(52) U.S. Cl. .................... 198/779; 198/461.3
(58) Field of Classification Search ............. 198/779, 198/461.1, 459.8, 461.2, 461.3, 853, 345.3; 193/35 A
See application file for complete search history.

(56) References Cited

U.S. PATENT DOCUMENTS

| | | | | |
|---|---|---|---|---|
| 2,296,201 A * | 9/1942 | Carter | ..... | 198/459.8 |
| 2,777,560 A * | 1/1957 | Campos | ..... | 400/290 |
| 3,292,767 A * | 12/1966 | Lobdell et al. | ..... | 198/459.8 |
| 3,373,860 A * | 3/1968 | Lindgren et al. | ..... | 198/459.8 |
| 3,589,497 A * | 6/1971 | Leach | ..... | 198/459.8 |
| 3,653,489 A * | 4/1972 | Tullis et al. | ..... | 198/779 |
| 3,675,760 A * | 7/1972 | Burrage et al. | ..... | 198/779 |
| 3,894,627 A * | 7/1975 | Jabbusch et al. | ..... | 198/461.1 |
| 4,003,466 A * | 1/1977 | Muth et al. | ..... | 198/452 |
| 4,176,741 A * | 12/1979 | Vogel | ..... | 198/457.03 |
| 4,262,794 A * | 4/1981 | Bourgeois | ..... | 198/459.8 |
| 4,736,864 A * | 4/1988 | Whitford | ..... | 220/203.11 |
| 5,190,137 A * | 3/1993 | Tas | ..... | 198/779 |
| 5,339,030 A * | 8/1994 | Hayashi | ..... | 324/207.23 |
| 6,230,908 B1 * | 5/2001 | Sloan et al. | ..... | 193/35 A |
| 6,244,426 B1 * | 6/2001 | Murano et al. | ..... | 198/784 |
| 6,318,544 B1 * | 11/2001 | O'Connor et al. | ..... | 198/853 |
| 6,494,312 B2 * | 12/2002 | Costanzo | ..... | 198/779 |
| 6,648,125 B1 * | 11/2003 | Bershadsky | ..... | 198/460.1 |
| 6,758,323 B2 * | 7/2004 | Costanzo | ..... | 198/457.02 |
| 7,040,480 B2 * | 5/2006 | Sedlacek | ..... | 198/457.02 |
| 7,111,721 B1 * | 9/2006 | Turner | ..... | 198/345.3 |

* cited by examiner

*Primary Examiner*—James R Bidwell
(74) *Attorney, Agent, or Firm*—Thomas, Kayden, Horstemeyer & Risley, LLP (57) ABSTRACT

Disclosed is a conveyor system for evenly spacing conveyed objects. The conveyor system includes a conveyor belt that includes a conveyor having cavities, rollers in some of the cavities and a positioning component. The conveyor system further includes a conveyor drive coupled to the conveyor system and a roller engagement surface positioned adjacent the conveyor belt and configured to engage the plurality of rollers.

21 Claims, 12 Drawing Sheets

SYSTEMS AND METHODS FOR PROVIDING AN IMPROVED TIMING CONVEYOR

CROSS-REFERENCE TO RELATED APPLICATION

This application is a continuation of copending U.S. utility application entitled, "Systems and Methods for Providing An Improved Timing Conveyor," having Ser. No. 11/203,711, filed Aug. 15, 2005, which is entirely incorporated herein by reference.

TECHNICAL FIELD

The invention relates generally to power-driven conveyors.

BACKGROUND

When conveying objects in a conveyor system, it is often necessary to arrange the objects in a known, relative position or to maintain minimum spacing on the conveyor belt. Prior art devices for addressing this need have utilized a multiplicity of sensors in combination with actuatable package-stopping components. One such device is described in U.S. Pat. No. 6,648,125 to Bershadsky, which is hereby incorporated by reference. Other methods of achieving conveyor spacing include standard conveyor belts having overhead or bottom mounted spacing bars, which travel at a different, usually slower, speed from the belt. These devices are complex and diminish conveyor efficiency as a result of slowing or stopping packages along the conveyor path. Thus, a heretofore unaddressed need exists in the industry to address the aforementioned deficiencies and inadequacies.

SUMMARY

Embodiments of the present disclosure provide a conveyor system for controlling spacing of conveyed objects comprising: a conveyor configured to transfer a plurality of objects in a first direction. The conveyor includes: a conveyor belt having a plurality of cavities; a plurality of rollers, each roller being disposed in a cavity and having an axis perpendicular to the first direction; and a positioning component provided adjacent the rollers. The conveyor system also includes a conveyor drive component coupled to the conveyor system, the conveyor drive component configured to drive the conveyor belt; and a roller engagement surface positioned adjacent the conveyor belt and configured to engage the plurality of rollers.

Embodiments of the present disclosure can also be viewed as providing a method of manufacturing a conveyor, comprising: disposing rollers into cavities of a conveyor belt, the rollers having a diameters that are larger than the thickness of the conveyor belt; securing an object-positioning component to the conveyor belt, the object-positioning component being configured to stop travel of objects along the conveyor belt; placing a roller engagement surface adjacent the conveyor belt and in contact with the rollers such that linear travel of the conveyor belt will cause the rollers to rotate; and coupling a conveyor drive component to the conveyor belt.

Embodiments of the present disclosure can further be viewed as providing a method for conveying objects, comprising: driving a conveyor belt in a direction of belt travel, the conveyor belt having a first roller disposed therein; contacting the first roller with a roller engagement surface being located underneath the conveyor belt to cause the first roller to rotate as the conveyor belt travels along the roller engagement surface; accelerating a first object on the conveyor belt relative to the conveyor belt as a result of rotation of the first roller; and halting the first object on the conveyor belt to achieve a specific interval between the first object and a second object.

Embodiments of the present disclosure can further be viewed as providing a conveyor belt for spacing conveyed objects, comprising: acceleration components configured to move an object along the conveyor belt; and a positioning component positioned along the conveyor belt, the positioning component configured to halt motion of the object on the conveyor belt.

Embodiments of the present disclosure can also be viewed as providing a method for positioning objects, comprising: accelerating an object along a conveyor belt such that the object travels faster than a speed of travel of the conveyor belt; and halting the object with a positioning component of the conveyor belt such that the object travels on the conveyor belt at the same speed as the conveyor belt and is held at a desired location along the conveyor belt.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications, and equivalents included within the spirit and scope of the disclosure as defined by the appended claims.

Figure 1:
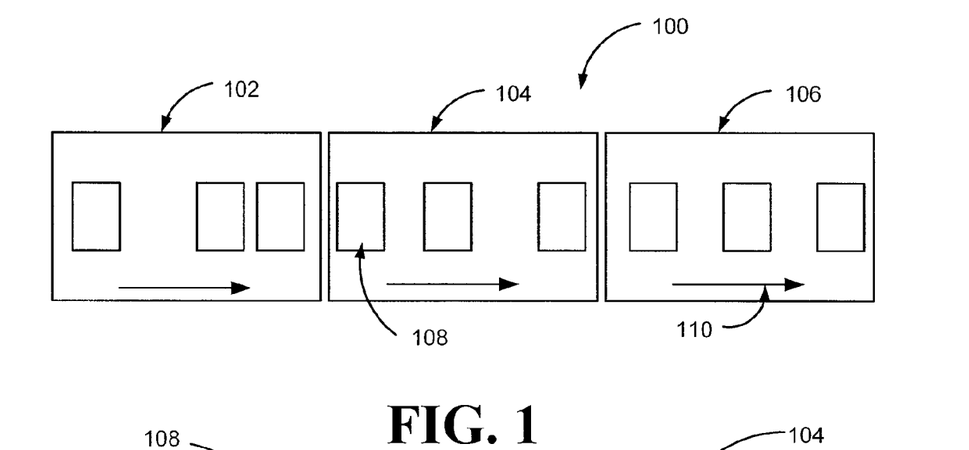
FIG. 1 is a block diagram illustrating a top view of an embodiment of a conveyor system utilizing a timing conveyer, as disclosed herein.

Reference is now made to FIG. 1, which is a block diagram illustrating a top view of an embodiment of a conveyor system utilizing a timing conveyor. The conveyor system 100 includes a feeder conveyor 102, timing conveyor 104, and a receiving conveyor 106. Each of these conveyors are utilized to transfer objects 108 in a belt travel direction 110. The objects 108 on the feeder conveyor 102 may be conveyed at random spacings or intervals. The objects 108 that transition from the feeder conveyor 102 to the timing conveyor 104 are repositioned by the timing conveyor 104 such that the receiving conveyor 106 receives the objects 108 at predetermined intervals. The predetermined intervals facilitate subsequent conveyor processes such as single-lane timing, side-by-side in-phase timing, side-by-side out-of-phase timing, and non-parallel merging.

Figure 2A:
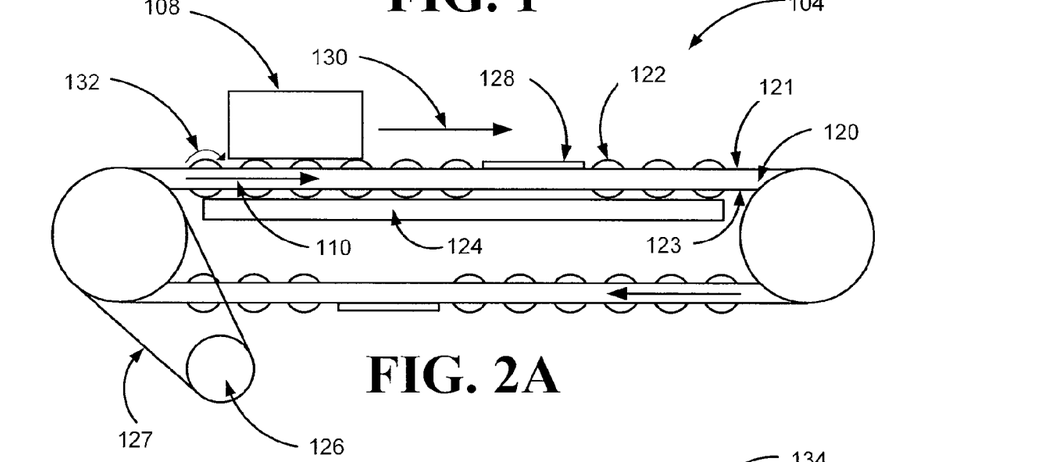
FIGS. 2A and 2B are block diagrams illustrating side views of an embodiment of a timing conveyor as disclosed herein at two different stages of processing.
Figure 2B:
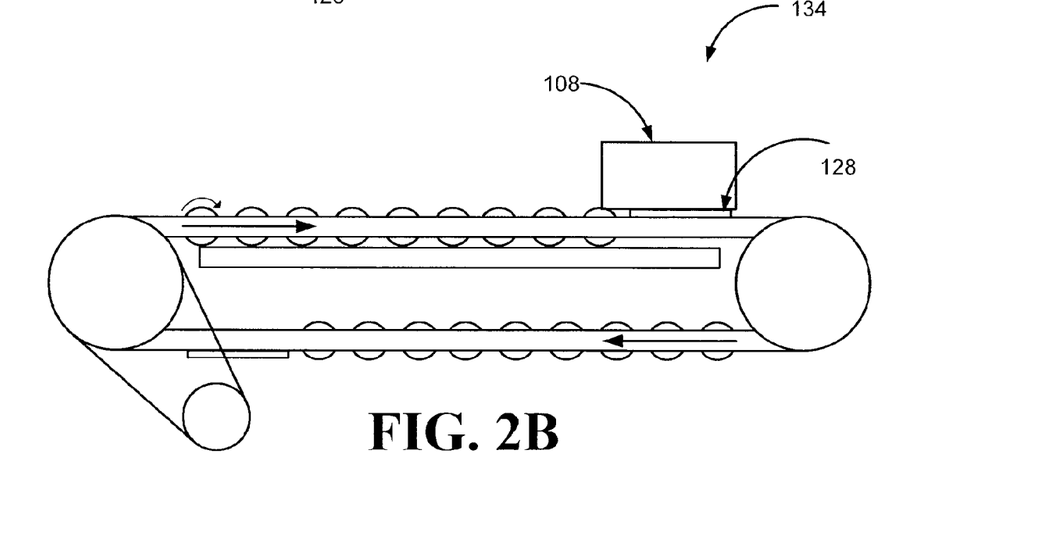

Reference is now made to FIGS. 2A and 2B, which are block diagrams illustrating side views of an embodiment of a timing conveyor at two different stages of processing. The timing conveyor 104 generally includes acceleration components and positioning components. This embodiment of the timing conveyor 104 includes a conveyor belt 120 having cavities (not shown here), that contain rollers 122, which are accelerating components. A non-limiting example of a conveyor belt 120 is a mat-top chain, as disclosed in U.S. Pat. No. 6,494,312 to Costanzo, which is hereby incorporated by reference. The rollers 122 are dimensioned and positioned such that each roller extends above a top surface 121 of the conveyor belt 120 and below a bottom surface 123 of the conveyor belt 120. The rollers 122 can be arranged in a non-limiting exemplary configuration of columns and rows. The rollers 122 are aligned within the conveyor belt to accelerate objects in the belt travel direction 110. The timing conveyor 104 also includes, as exemplary positioning components, friction pads 128, that are placed at specific intervals along the top surface 121 of the conveyor belt 120. A roller engagement surface 124 is positioned under the conveyor belt 120 such that the rollers 122 contact the roller engagement surface 124. The roller engagement surface 124 can be a generally planar component and can include a top surface having a high coefficient of friction. A rubber or rubber type compound is one non-limiting example of material having a high coefficient of friction. The timing conveyor 104 also includes a conveyor drive component 126. Although the conveyor drive component 126, as illustrated in FIGS. 2A and 2B, is shown as an externally-mounted rotary drive component that is mechanically coupled to the conveyor belt 120 using a belt or a chain 127, the conveyor drive component 126 can take many different forms within the scope and spirit of this disclosure. For example, the conveyor drive component 126 may be coupled directly to the timing conveyor 104 or may be mechanically coupled using other techniques including, but not limited to, gearboxes, drive shafts, and universal joints.

As shown in FIG. 2A, as the conveyor belt 120 moves in the belt travel direction 110, the rollers 122 contact the roller engagement surface 124. The frictional engagement between the rollers 122 and the roller engagement surface 124 cause roller rotation 132. When an object 108 is supported by a roller 122, the roller rotation 132 causes the object 108 to achieve a speed 130 relative to the conveyor belt 120 that equals the speed of the conveyor belt 120 relative to the roller engagement surface 124, such that the object 108 moves at twice the speed of the conveyor belt 120. The object 108 moves along the conveyor belt 120 until it reaches a friction pad 128. In this way, each object 108 advances to a designated position 134, as illustrated in FIG. 2B. The designated position 134 generally corresponds to and is determined by the location of the friction pad 128. The friction pad 128 is a non-limiting example of numerous types of positioning components contemplated within the scope and spirit of this disclosure. Additionally, a timing conveyor 104 can be configured in different lengths that can include different quantities of designated positions 134.

Figure 3:
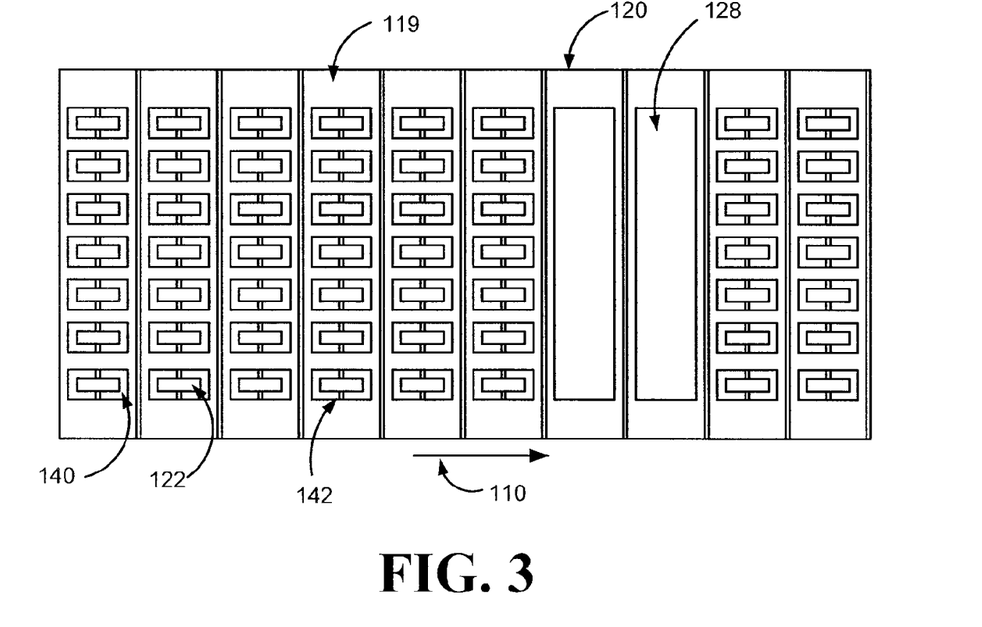
FIG. 3 is a block diagram illustrating top partial view of a conveyor in an embodiment, as disclosed herein.

Reference is now made to FIG. 3, which is a block diagram illustrating a top partial view of a conveyor belt in an embodiment. In the embodiment of FIG. 3, the conveyor belt 120 comprises a mat-top chain that includes multiple chain segments 119 hingeably secured to one another to form a conveyor loop. The chain segments 119, which can be mat-top chain segments, include multiple cavities 140, which can receive rollers 122 mounted on axles 142, for example. The chain segments 119 can also receive friction pads 128. As discussed above in reference to FIGS. 2A and 2B, the rollers 122, by virtue of contact with the roller engagement surface 124, cause an object to move relative to the conveyor belt 120 in the belt travel direction 110. When the object reaches the chain segments 119 having friction pads 128 the motion of the object relative to the conveyor belt 120 is halted. In this manner, the locations of friction pads 128, or alternative positioning components, determine the ultimate spacing between conveyed objects.

Figure 4:
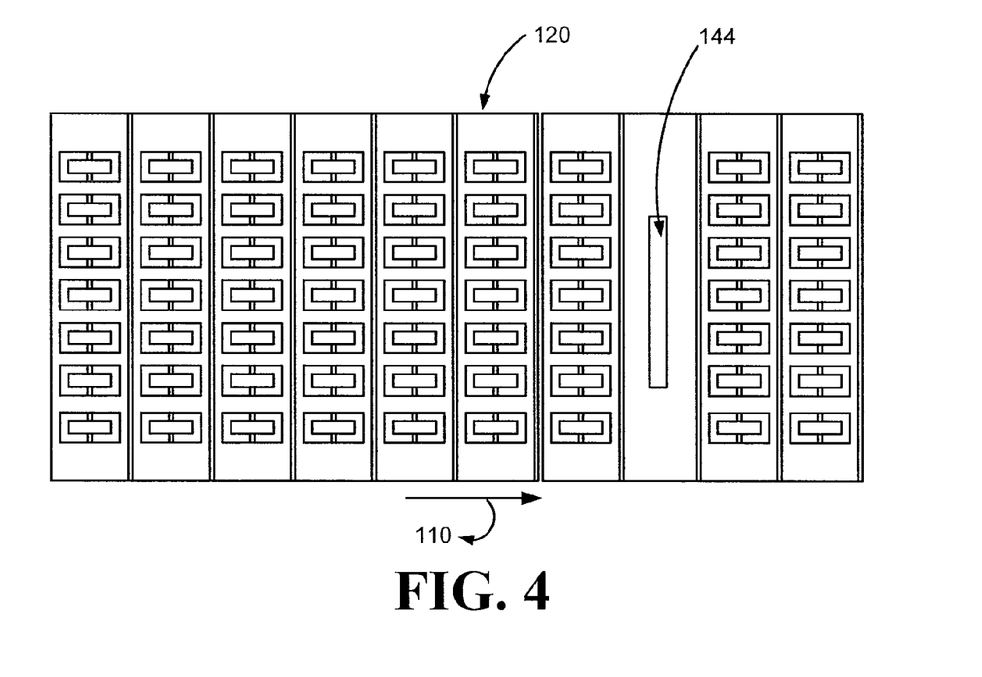
FIG. 4 is a block diagram illustrating top partial view of a conveyor in another embodiment, as disclosed herein.

Reference is now made to FIG. 4, which is a block diagram illustrating a top partial view of a conveyor in another embodiment. In this embodiment, the positioning component on the conveyor belt 120 is a flight 144. A flight 144 can be generally described as a stop mounted along or on a conveyor that interferes with the movement of an object relative to the conveyor at a specific point along the conveyor. In contrast with the friction pad discussed above in reference to FIG. 3, the flight 144 is not generally co-planar with the surface created by the rollers 122 and, instead, extends above the plane created by the rollers 122. Extending above the plane defined by the tops of the rollers, the flight 144 provides a relatively-inflexible stopping position for the object on the conveyor. A flight 144, in contrast with friction pads 128, may provide for a more precisely-controlled designated position. Additionally, unlike a friction pad 128, the designated position using a flight 144 is less likely to vary with conveyor speed. Depending on the nature of the objects on the conveyor, the friction pad 128 may be more desirable because of the rate of deceleration is less than that associated with using a flight 144. The positioning component can be implemented as a friction pad, a flight, a combination thereof, or other suitable component.

Figure 5A:
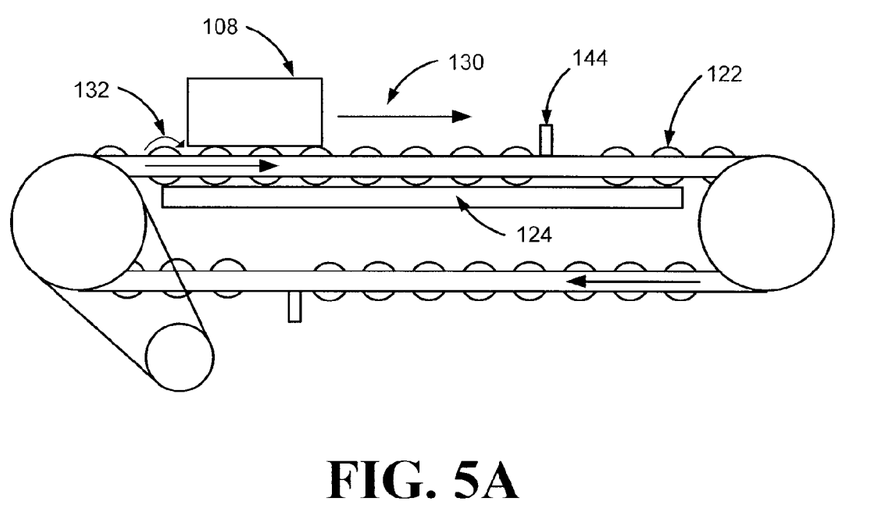
FIGS. 5A and 5B are block diagrams illustrating side views of another embodiment of a timing conveyor as disclosed herein at two different stages of processing.
Figure 5B:
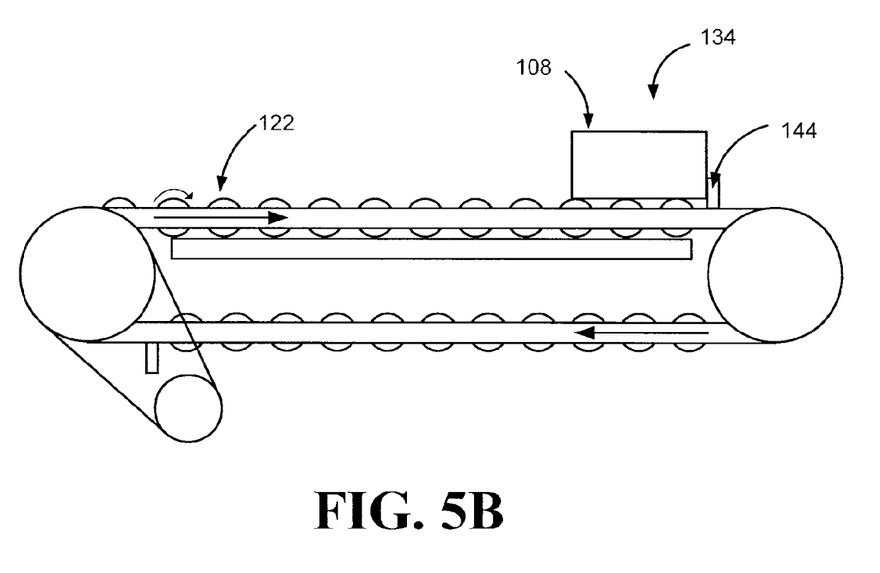

Reference is now made to FIGS. 5A and 5B, which are block diagrams illustrating side views of another embodiment of a timing conveyor at two different stages of processing. As shown in FIG. 5A, the object 108 is moving at a relative speed 130 via engagement with the rollers 122. As shown in FIG. 5B, when the object 108 reaches the designated position 134, as defined by the flight 144, the object 108 is halted relative to the conveyor belt 120. In this manner, each of the objects conveyed will exit the timing conveyor at an interval determined by the distance between the flights 144.

Figure 6:
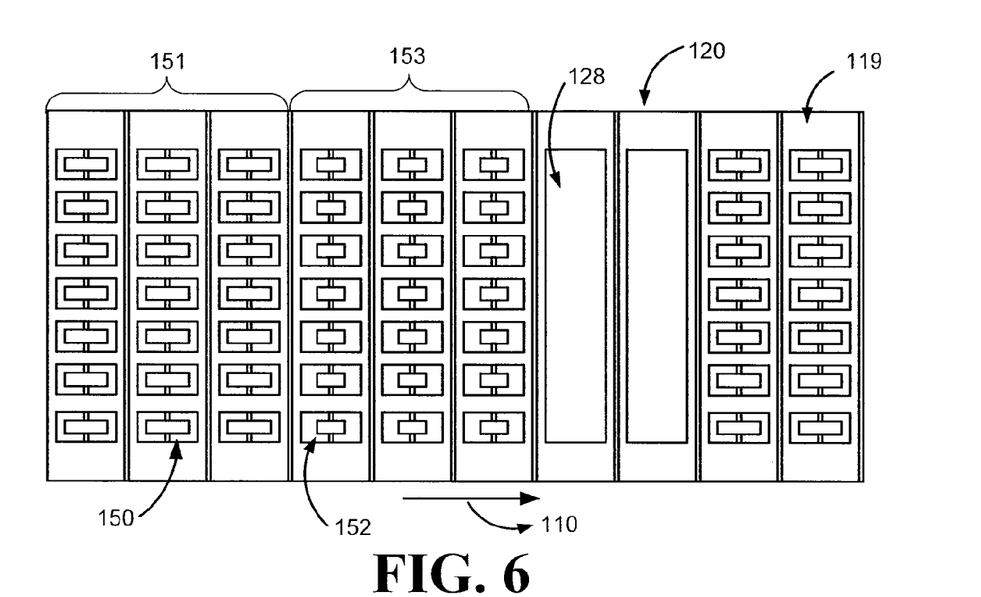
FIG. 6 is a block diagram illustrating top partial view of another embodiment of a conveyor, as disclosed herein.

Reference is now made to FIG. 6, which is a block diagram illustrating a top partial view of another embodiment of a conveyor. The conveyor belt 120 can include multiple chain segments 119 that can have either rollers or positioning components such as, for example, friction pads 128. The conveyor belt 120 includes a high-engagement zone 151 and a low-engagement zone 153. A high-engagement zone 151 is generally characterized by a substantial frictional engagement between the rollers 150 and the conveyed object 108 such that slippage between the rollers 150 and the conveyed object 108 is reduced or eliminated. Similarly, a low-engagement zone 153 is generally characterized by a reduced level of frictional engagement between the rollers 152 and the conveyed object 108, relative to the high-engagement zone 151. Accordingly, slippage between the rollers 152 and the conveyed object 108 is increased relative to the slippage experienced in the high-engagement zone 151.

The high-engagement zone 151 is configured with rollers 150 designed to increase the frictional engagement with the conveyed object 108 by reducing or eliminating slippage between the rollers 150 and the conveyed object 108. One technique for reducing or eliminating slippage is the use of large rollers 150. Additionally or alternatively, the high-engagement zone 151 can utilize rollers 150 having surfaces with a relatively large friction coefficient to provide a greater frictional engagement between the roller 150 and the conveyed object 108. Similarly, the low-engagement zone 153 can utilize small rollers 152 and/or rollers having a surface with a relatively low friction coefficient. Small rollers 152 and/or low friction coefficient rollers permit the conveyed object 108 to slip on the rollers both during deceleration and after the conveyed object 108 stops relative to the conveyor. Optionally, the conveyor belt 120 can include more than two levels of engagement where the different levels of engagement can be achieved through the use of different sized rollers, rollers having different friction coefficients, and any combination thereof.

Figure 7:
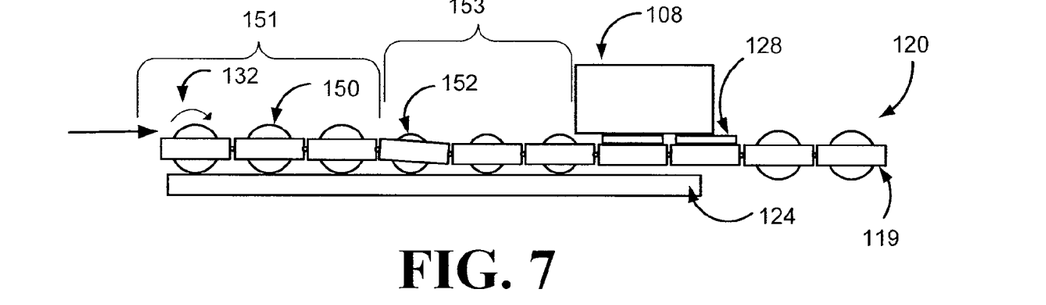
FIG. 7 is a block diagram illustrating a side view of the embodiment of FIG. 6.
Figure 8:
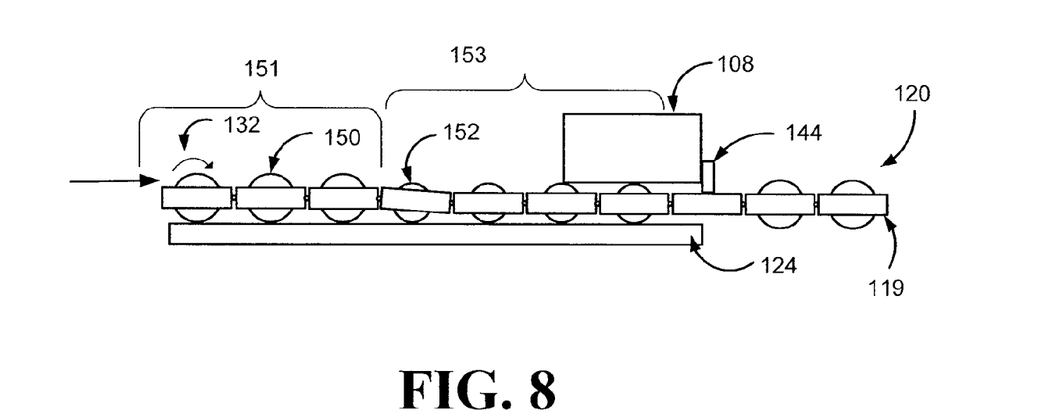
FIG. 8 is a block diagram illustrating a side view of another embodiment of a conveyor, as disclosed herein.

Reference is made to FIG. 7, which is a block diagram illustrating a side view of an embodiment as illustrated in FIG. 6. The conveyor belt 120 includes a high-engagement zone 151 having large rollers 150 and a low-engagement zone 153 having small rollers 152. As discussed above in reference to FIG. 6, the low-engagement zone 153 may also feature rollers having a lower coefficient of friction thereby permitting slippage between the roller and the object as the object decelerates through contact with the friction pad 128. As illustrated, the flexible nature of the conveyor belt 120 allows both the large rollers 150 and the small rollers 152 to engage the roller engagement surface 124. In this manner rollers 150, 152 in both the high-engagement zone 151 and the low-engagement zone 153 experience rotation via contact with the roller engagement surface 124. As shown in FIG. 8, which is a block diagram illustrating a side view of another embodiment of a conveyor belt 120, the multiple-engagement zone concept can also be implemented using a flight 144 as the positioning component. The flight 144 can be implemented in various different ways. For example, the flight 144 may be configured as a fixed-position structure that maintains an extended position on the conveyor. Alternatively, the flight 144 can be a moveable flight that is actuatable at, for example, one or more specific locations along the conveyor path.

Figure 9:
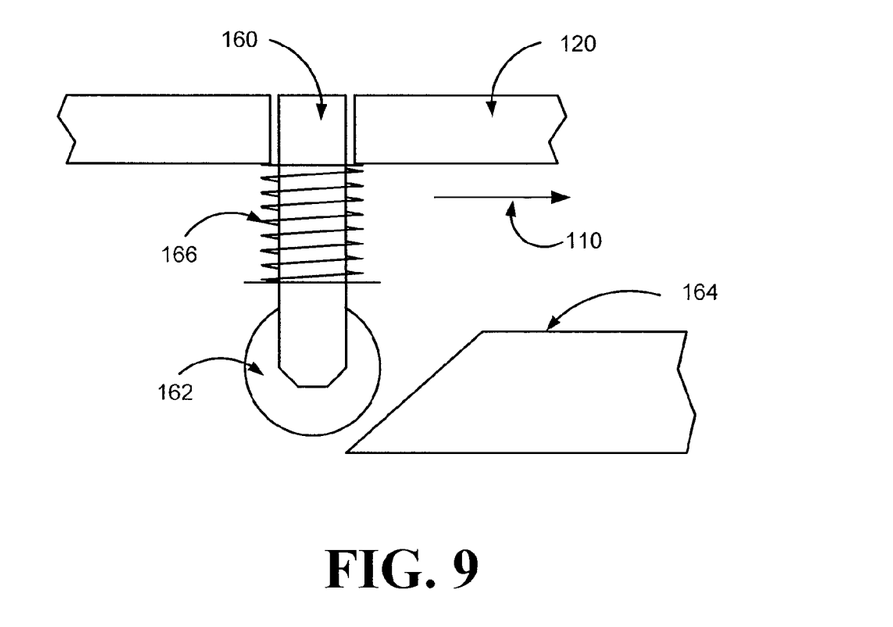
FIG. 9 is a partial side view of an embodiment of a linearly-actuatable flight in the retracted position, as disclosed herein.
Figure 10:
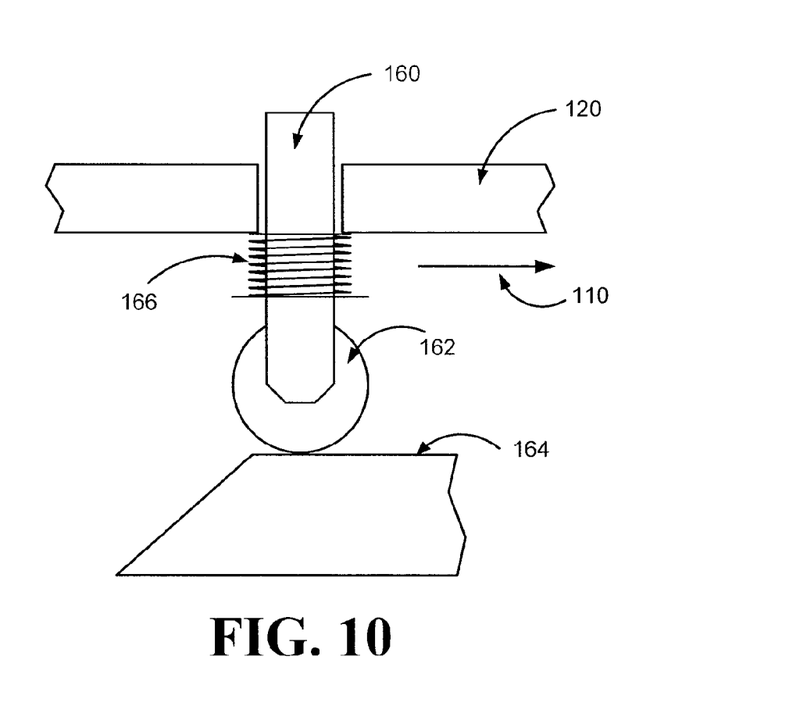
FIG. 10 is a partial side view of an embodiment of a linearly-actuatable flight in the extended position, as disclosed herein.

Reference is made to FIG. 9, which is a partial side view of an embodiment of a linearly-actuatable flight in the retracted position. The linearly-actuatable flight 160 is secured to the conveyor belt 120 and does extend above the surface of the conveyor belt 120 in the retracted position. The linearly-actuatable flight 160 includes a cam roller 162 and optionally includes a biasing element 166 for maintaining a retracted position when the linearly-actuatable flight 160 is not actuated. As the conveyor belt 120 moves in the belt travel direction 110 the cam roller 162 engages a cam surface 164 and vertically displaces the flight 160 to a position extended above the plane defined by the top surface of the adjacent rollers 152. In a non-limiting example, the cam surface 164 can be the roller engagement surface or a designated surface of the roller engagement surface. Alternatively, the cam surface 164 can be a separate structure for actuating the flight 160 and, further, can be adjustable to provide independent control of the flight position. As shown in FIG. 10, which is a partial side view of an embodiment of a linearly-actuatable flight in the extended position, the cam roller 162 engages the cam surface 164 and displaces the linearly-actuatable flight 160 to a position extended above the conveyor belt 120. While the engagement of the cam roller 162 is sufficient to extend the linearly-actuatable flight 160 when unimpeded, the actuation of the flight 160 may not be performed with the force necessary to extend in the event a conveyed object is placed over the linearly-actuatable flight 160. Alternatively (not shown), the linearly-actuatable flight 160 can be configured to include a multi-piece telescopically-configured assembly that includes an internal biasing element where the multiple pieces collapse if the linearly-actuatable flight 160 is actuated under a conveyed object.

Figure 11:
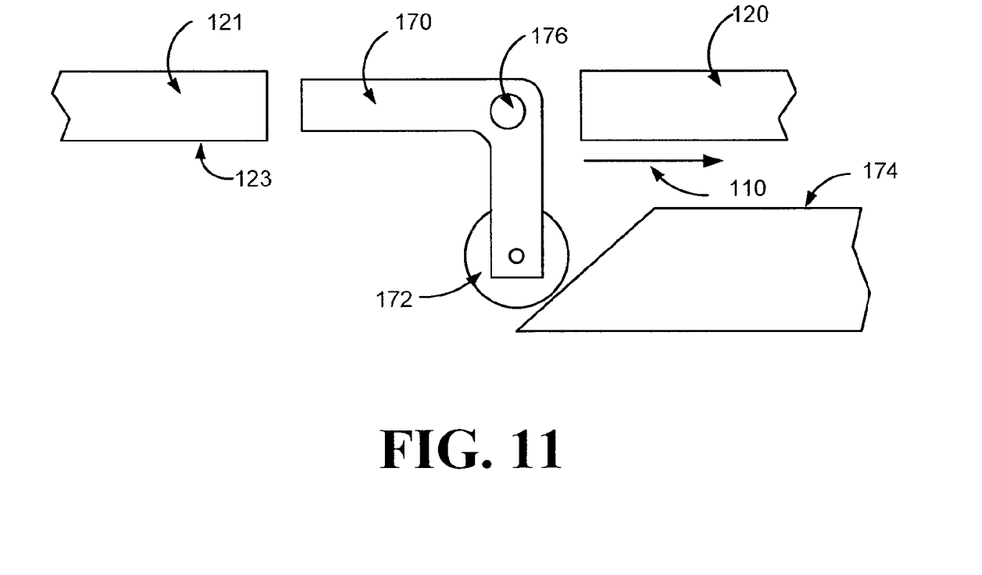
FIG. 11 is a partial side view of an embodiment of a rotationally-actuatable flight in the retracted position, as disclosed herein.
Figure 12:
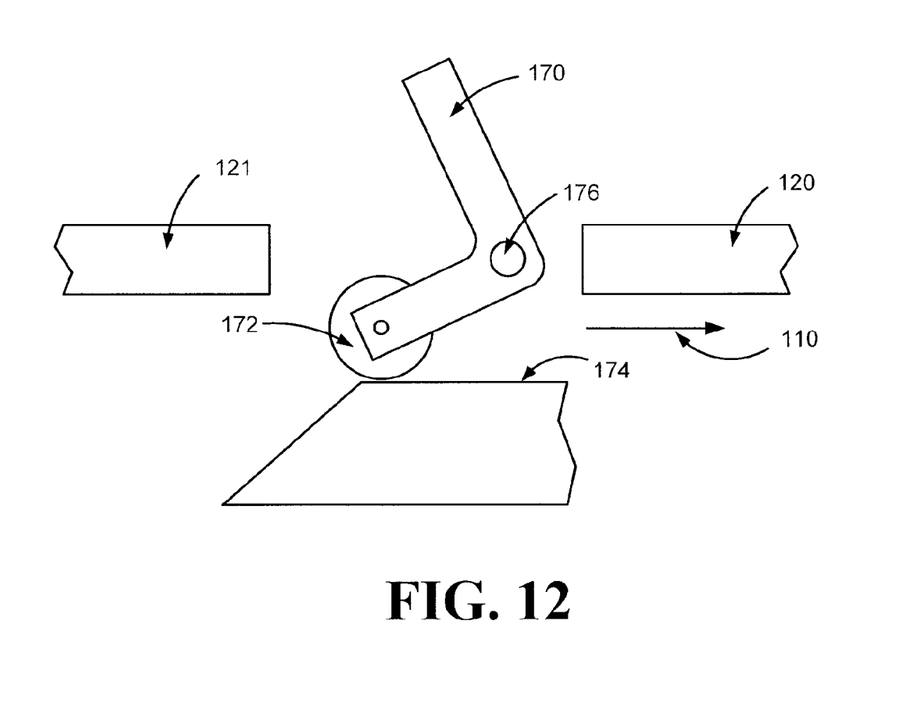
FIG. 12 is a partial side view of an embodiment of a rotationally-actuatable flight in the extended position, as disclosed herein.

Reference is now made to FIG. 11, which is a partial side view of an embodiment of a rotationally-actuatable flight in the retracted position. The rotationally-actuatable flight 170 is pivotally mounted in a cavity of the conveyor belt 120 via a pivot pin or axle 176. The rotationally-actuatable flight 170 extends from the pivot pin 176 in two general directions. The rotationally-actuatable flight 170 extends in a first direction that is generally parallel to and, when retracted, is recessed below the top surface 121 of the conveyor or the plane defined by the top surfaces of the rollers in the conveyor. The rotationally-actuatable flight 170 extends in a second direction below the bottom surface 123 of the conveyor belt 120. In this second direction, the rotationally-actuatable flight 170 includes a cam roller 172. As the conveyor belt 120 proceeds in the belt travel direction 110, the cam roller 172 engages a cam surface 174. As illustrated in FIG. 12, which is a partial side view of an embodiment of a rotationally-actuatable flight in the extended position, the engagement between the cam roller 172 and the cam surface 174 causes the rotationally-actuatable flight 170 to pivot about the pivot pin 176. This pivotal action causes the rotationally-actuatable flight 170 to extend above the top surface 121 of the conveyor belt 120.

Figure 13:
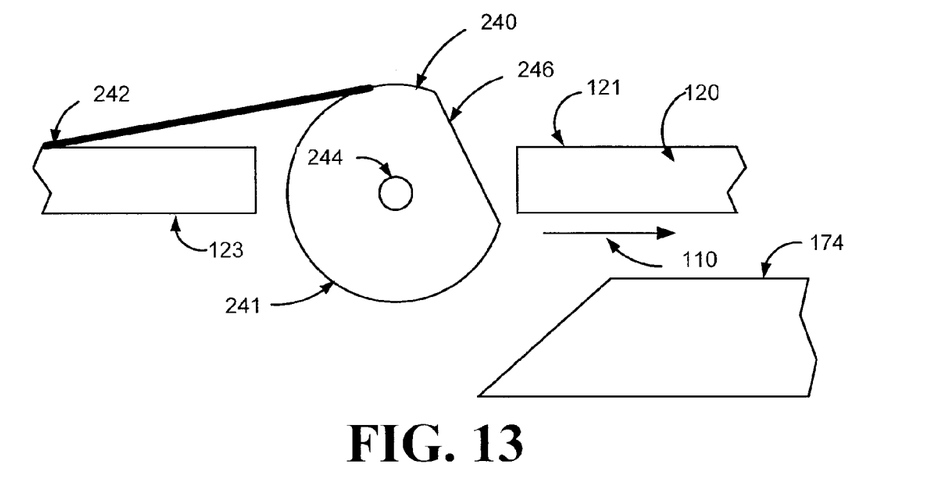
FIG. 13 is a partial side view of an alternative embodiment of a rotationally-actuatable flight in the retracted position, as disclosed herein.
Figure 14:
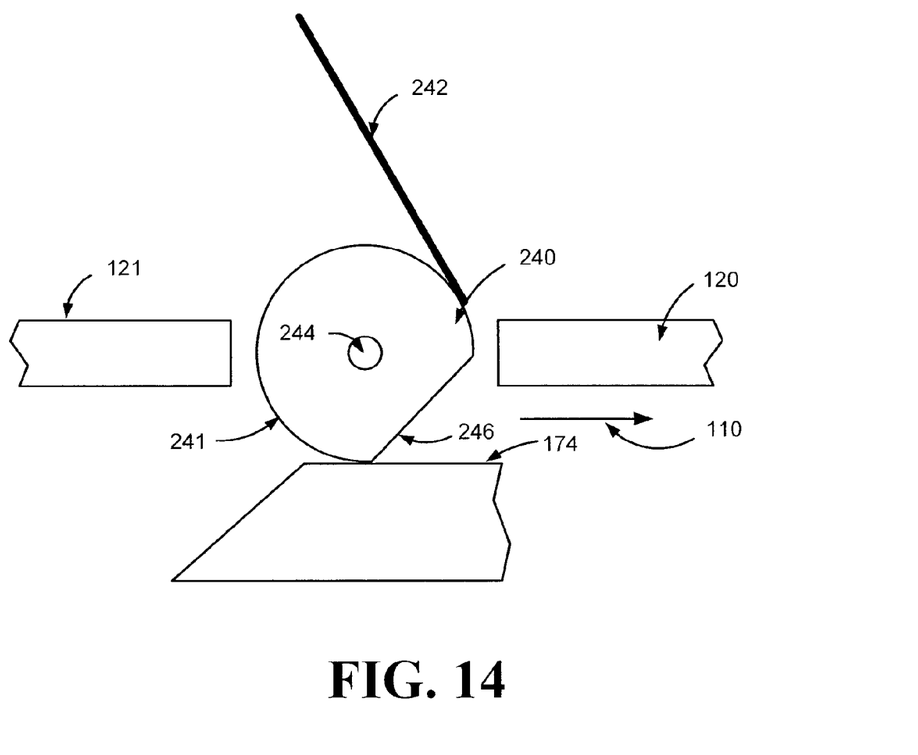
FIG. 14 is a partial side view of an alternative embodiment of a rotationally-actuatable flight in the extended position, as disclosed herein.

Reference is now made to FIG. 13, which is a partial side view of an alternative embodiment of a rotationally-actuatable flight in the retracted position. The rotationally-actuatable flight 240 is pivotally mounted in a cavity of the conveyor belt 120 via a pivot pin or axle 244. The rotationally-actuatable flight 240 includes a roller 241 having a flat side 246 and a flight extending member 242. In the retracted position, the flight extending member 242 generally rests on the top surface 121 of the conveyor belt 120 below or at the plane defined by the top surfaces of the rollers in the conveyor 120. As the conveyor belt 120 proceeds in the belt travel direction 110, the roller 241 engages a cam surface 174. As illustrated in FIG. 14, which is a partial side view of an alternative embodiment of a rotationally-actuatable flight in the extended position, the engagement between the roller 241 and the cam surface 174 causes the rotationally-actuatable flight 240 to pivot about the pivot pin 176. This pivotal action causes the rotationally-actuatable flight extending member 242 to extend above the top surface 121 of the conveyor belt 120. When an object moving along the top of the rollers engages the flight extending member 242, the roller 241 is rotated further to a position where the flat side 246 of the roller 241 is proximate to the cam surface 174. When the flat side 246 is proximate to the cam surface 174, the rotationally-actuatable flight does not frictionally engage the cam surface 174 and slipping does not occur.

The linearly- and rotationally-actuatable flights are merely examples of flights contemplated in this disclosure and are not intended to limit the scope or spirit of the disclosure. For example, an actuatable flight can be configured to be performed by multiple flights operatively engaged with one or more cams, where a cam includes, but is not limited to, a cam roller, an eccentric lobe on a rotary cam surface, and a cam surface, among others.

Figure 15:
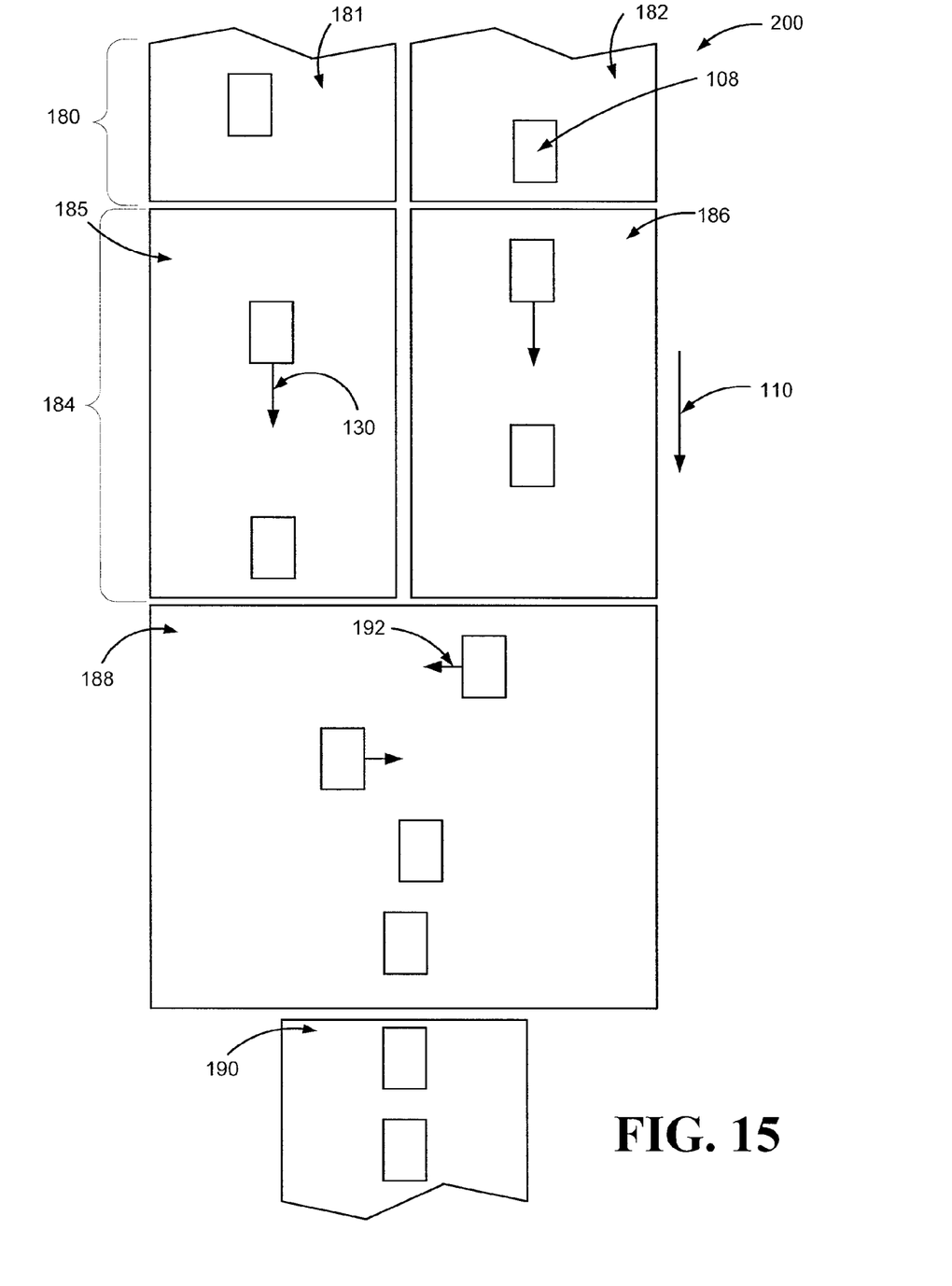
FIG. 15 is block diagram illustrating a partial top view of an embodiment of a conveyor system that utilizes a timing conveyor belt, as disclosed herein.

Reference is now made to FIG. 15, which is a block diagram illustrating a partial top view of an embodiment of a conveyor system that utilizes a timing conveyor belt. The conveyor system 200 includes a feeder section 180, a timing section 184, a singulating section 188, and a subsequent processing section 190. The feeder section 180 includes a first feed conveyor 181 and a second feed conveyor 182. Each of the feed conveyors 181, 182 can transfer objects 108 to the timing section 184 at irregular intervals and in irregular lateral belt positions. The timing section 184 includes a first timing conveyor 185 and a second timing conveyor 186, corresponding to the first and second feed conveyors 181, 182, respectively. Objects 108 that are received by the timing section 184 are accelerated to a relative speed 130 until they reach designated positions on the first and second timing conveyors 185, 186. In this non-limiting example, the designated positions of the first and second timing conveyors 185, 186 are established such that the objects 108 leave the timing section 184 out of phase. In other words, an object leaving the first timing conveyor 185 will arrive at the singulating section 188 between successive objects leaving the second timing conveyor 186.

In other embodiments, the timing section 184 is utilized to deliver objects 108 to a subsequent process conveyor at substantially identical, or in-phase, positions. When the objects 108 are delivered to the singulating section 188, they are directed in a lateral direction 192 towards the center of the singulating section 188. By positioning the objects on the first and second conveyors 185, 186, respectively, in an out-of-phase arrangement, the resulting singulated objects are configured to be in a single line and are evenly spaced for subsequent processing. When the objects 108 are received by the conveyor 190 for subsequent processing, they are arranged in a single column having fixed and even distances between the object. The conveyor system depicted in FIG. 15 is merely exemplary and not intended to limit the scope or spirit of the disclosure in any way. For example, a first and second timing conveyor can be used side-by-side in parallel and in phase such that two objects can be delivered side-by-side for a downstream process. Additionally, multiple timing conveyors can be used in a non-parallel arrangement in, for example, a merging operation to ensure that conveyed objects never contact each other when merging.

Figure 16:
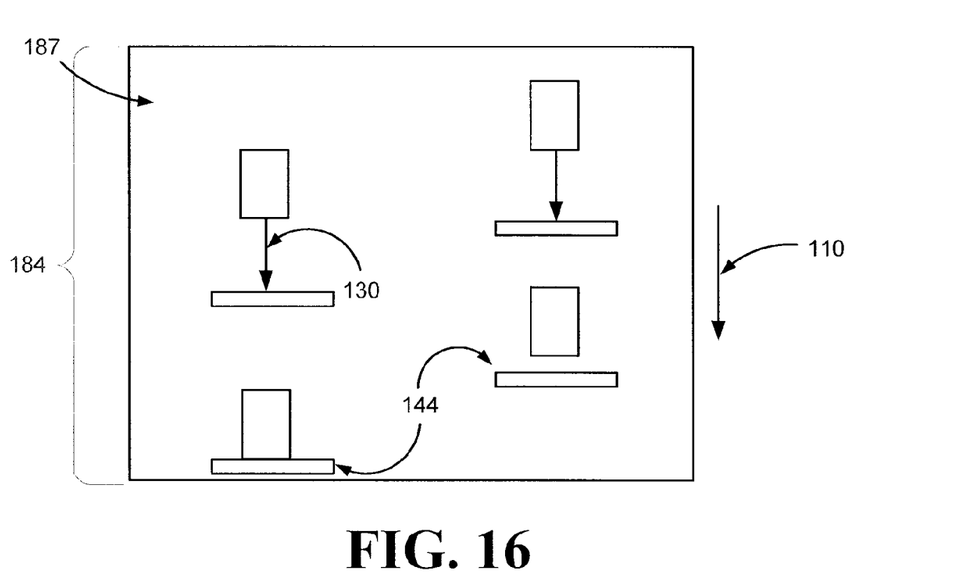
FIG. 16 is a block diagram illustrating a partial top view of an alternative embodiment of a timing section illustrated in FIG. 13.

Reference is made to FIG. 16, which is a block diagram illustrating a partial top view of an alternative embodiment of a timing section 184 as illustrated in FIG. 15. Instead of the timing section 184 including multiple timing conveyors 185, 186 to accomplish a desired phase relationship between multiple conveyor sources, the timing section 184 includes one timing conveyor 187. The timing conveyor 187 includes multiple flights 144 arranged to engage a portion of the belt width and positioned with a relative spacing to create the desired phase relationship between the multiple conveyor sources. For example, as illustrated, the flights 144 are configured to space the conveyed objects on the left side of the conveyor out of phase with the objects on the right side of the conveyor. In the alternative, if simultaneous arrival of the objects is desired, the flights on the left and right sides are arranged adjacent one another. Additionally, frictions pads or other positioning components can be utilized instead of flights.

Figure 17:
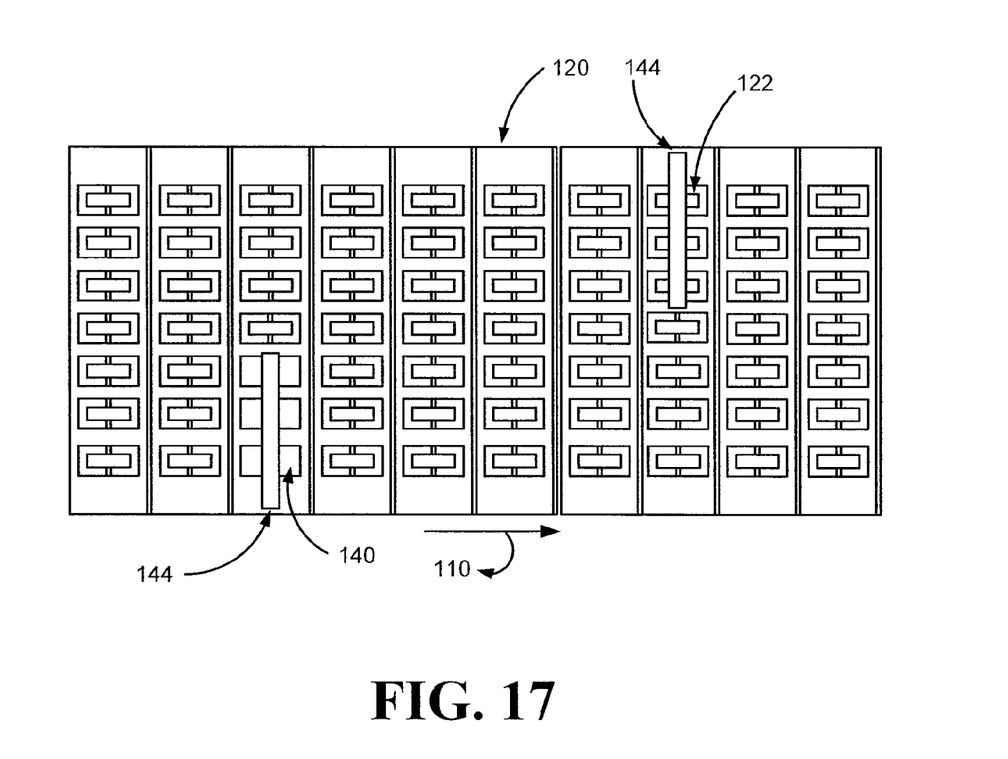
FIG. 17 is a block diagram illustrating a partial top view of an embodiment of a conveyor as utilized in embodiments of FIG. 14.

Reference is now made to FIG. 17, which is a block diagram illustrating a partial top view of an embodiment of a conveyor as utilized in embodiments of FIG. 16. The conveyor belt 120 includes multiple flights 144 each configured to span only a portion of the width of the conveyor belt 120. In this manner, objects delivered to different portions of the conveyor belt 120 can be arranged to be delivered in an out-of-phase configuration to a subsequent conveyor system component (not shown here). The conveyor belt 120 can be configured to receive the flights 144, or other positioning components, over or in the multiple cavities 140. Alternatively, the flights 144, or other positioning components, can be attached to the conveyor belt 120 without removing rollers 122 from the cavities 140. The ability to easily configure the arrangement of the positioning components greatly increases the flexibility and the utility of the timing conveyor.

Figure 18:
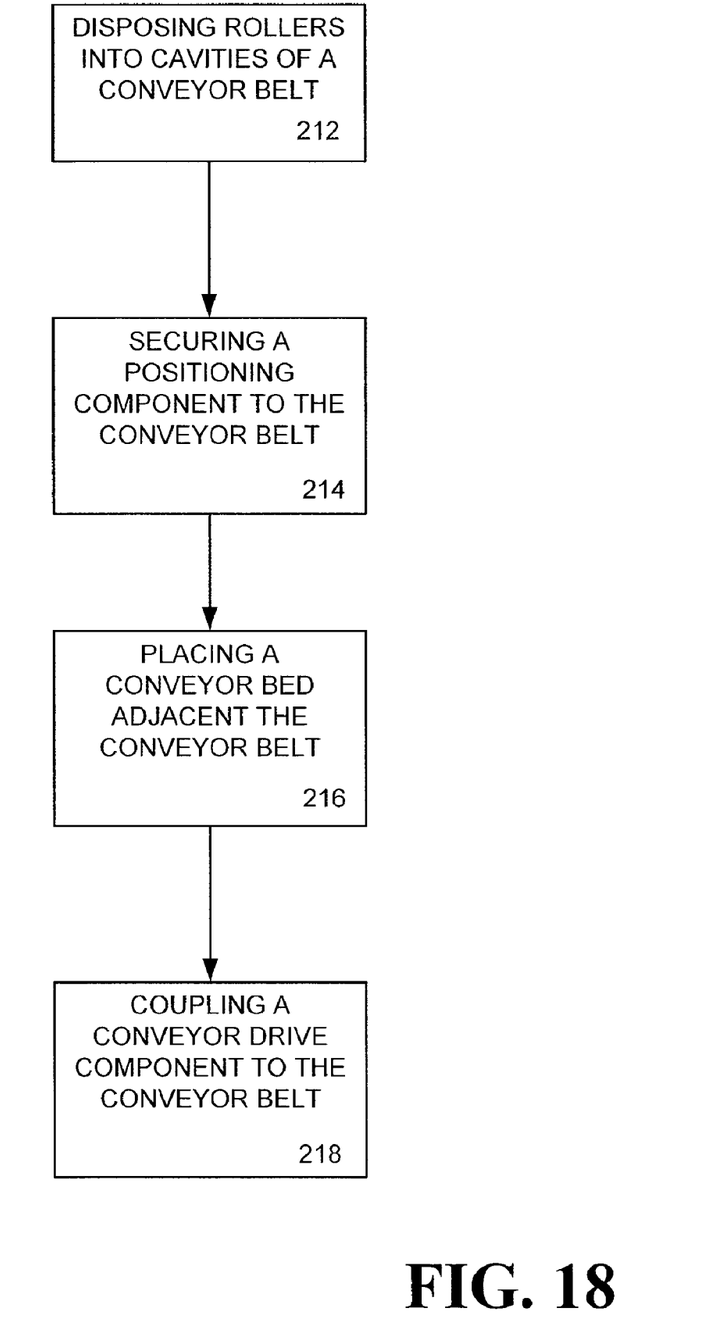
FIG. 18 is a block diagram illustrating an embodiment of a method of manufacturing a conveyor.

Reference is now made to FIG. 18, which is a block diagram illustrating an embodiment of a method of manufacturing a conveyor, as disclosed herein. In block 212, A roller is disposed into a cavity of a chain segment. A positioning component is secured to the conveyor belt in block 214. In block 216, a roller engagement surface in placed adjacent to the conveyor belt and, in block 218, a conveyor drive component is coupled to the conveyor belt.

The conveyor can optionally include rollers of a variety of sizes and having a variety of frictional properties. The different roller configurations can be arranged to create zones functioning at different levels of engagement with a conveyed object. For example, larger rollers having a higher friction coefficient can be used in a high-engagement zone to improve acceleration performance. Similarly, smaller rollers having a lower friction coefficient can be used in a low-engagement zone where slipping between the conveyed object and the rollers is a desirable property.

The conveyor system may also employ a variety of different positioning components. For example, one or more friction pads can be used to provide a relatively smooth deceleration. Alternatively, fixed or actuatable flights can be used to provide a more accurate stopping position. Additionally, the number of positioning components and the spacing therein can be configured, in conjunction with the conveyor speed, to determine the final interval or distance between conveyed objects. Further, the conveyor can be driven by a variety of different drive types utilizing a variety of different drive coupling methods, as discussed above.

Figure 19:
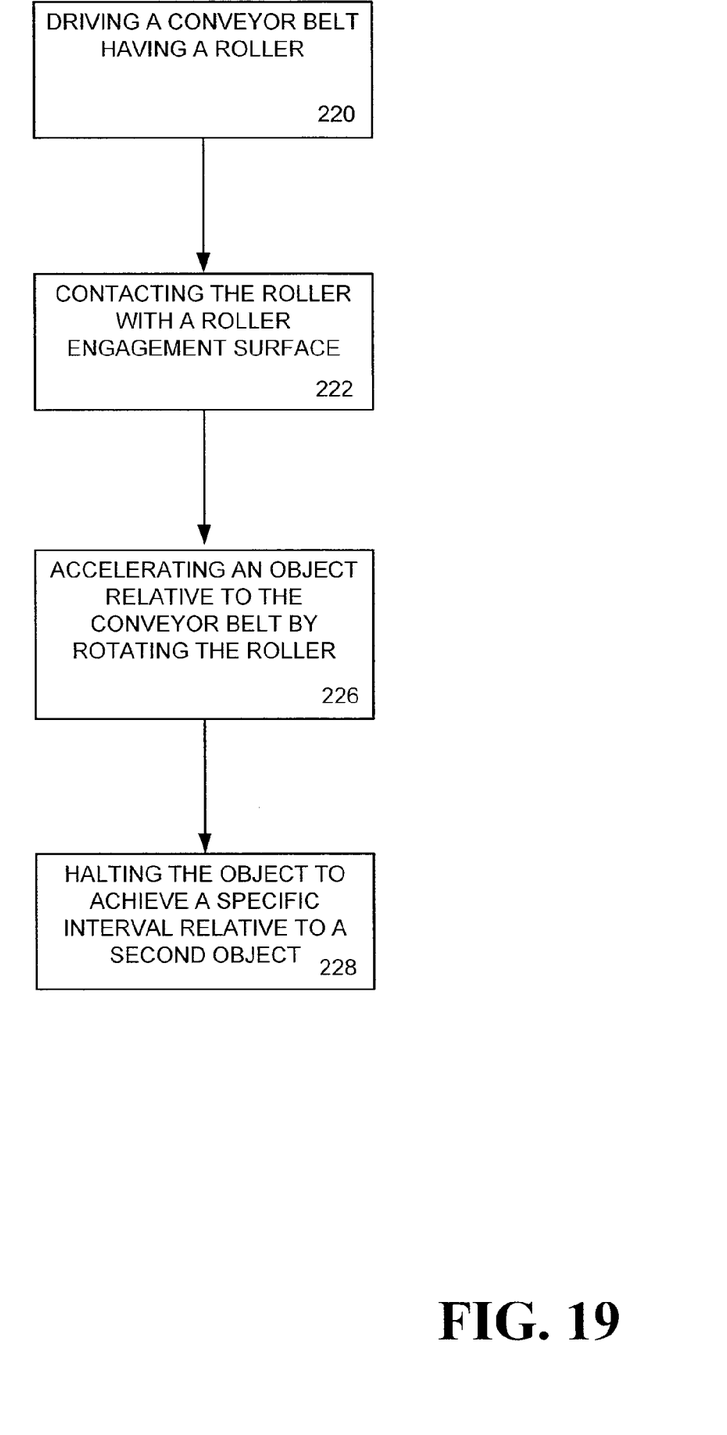
FIG. 19 is a block diagram illustrating an embodiment of a method for conveying objects.
Figure 20:
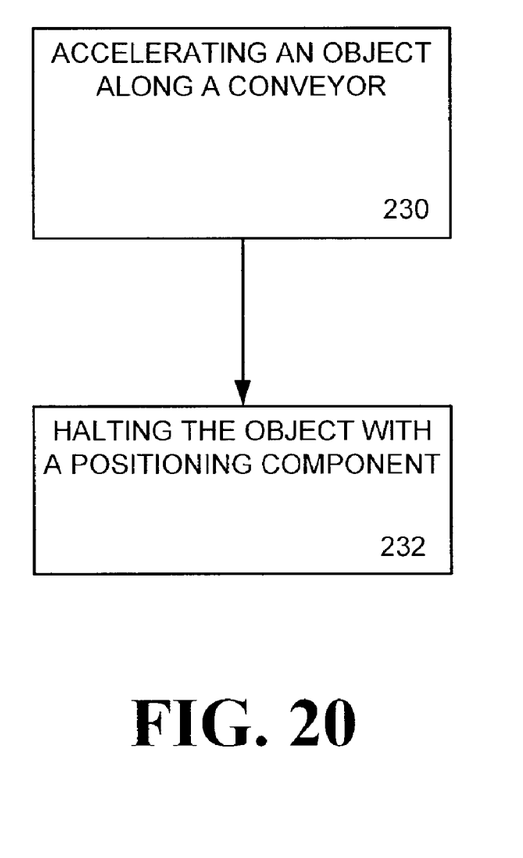
FIG. 20 is a block diagram illustrating an embodiment of a method for positioning objects.

Reference is now made to FIG. 19, which is a block diagram illustrating an embodiment of a method for equally spacing objects. In block 220 a conveyor belt having a roller is driven and a roller engagement surface is contacted with the roller in block 222. As the conveyor belt travels along the roller engagement surface, the roller is rotated. In block 226 an object is accelerated relative to the conveyor belt from contact with the rotating roller. The object is halted on the conveyor belt to achieve a specific interval relative to a second object in block 228. Similarly, referring to FIG. 20, some embodiments of the disclosure herein can be viewed as a method for positioning objects. The method is initiated when an object is accelerated along a conveyor belt in block 230. In accordance with a desired position, the object is halted with a positioning component in block 232. Moving the object relative to the conveyor permits the definition of desired spacing without reducing the conveyor speed, thereby increasing the throughput and thus the efficiency of the conveyor operation.

It should be emphasized that the above-described embodiments of the present disclosure, particularly, any illustrated embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

I claim:

1. A conveyor system comprising:
    a feeder section configured to convey objects in parallel columns, the objects of the columns being located at random positions along a longitudinal direction of the feeder section;
    a timing section comprising a timing conveyor belt including a plurality of rollers each having an axis of rotation perpendicular to a longitudinal direction of the timing conveyor belt, the timing conveyor belt further including stop members provided at predetermined positions along a length of the timing conveyor belt, the stop members being adapted to limit travel of the objects traveling along the timing conveyor belt; and
    a cam positioned adjacent the timing conveyor belt and adapted to engage the rollers;
    wherein when the cam engages the rollers, the rollers rotate to drive the objects along the timing conveyor belt toward respective stop members that halt their travel, such that the positions of the objects can be controlled to coincide with the predetermined positions of the stop members.

2. The system of claim 1, wherein the stop members comprise friction pads upon which the objects come to rest.

3. The system of claim 1, wherein the stop members comprise flights against which the objects abut.

4. The system of claim 1, wherein the timing section comprises two parallel timing conveyor belts each including a plurality of rollers having an axis of rotation perpendicular to a longitudinal direction of the timing conveyor belt, the timing conveyor belts further including stop members provided at predetermined positions along lengths of the timing conveyor belts, the stop members being adapted to limit travel of the objects traveling along the timing conveyor belts.

5. The system of claim 4, wherein the stop members of one of the timing conveyor belts are positioned so as to be staggered relative to the stop members of the other timing conveyor belt along the longitudinal directions of the timing conveyor belts, such that objects in the columns can be positioned out-of-phase relative to each other along the longitudinal directions of the time conveyor belts.

6. The system of claim 4, wherein the stop members of each timing conveyor belt are equally spaced along the longitudinal directions of the timing conveyor belts.

7. The system of claim 1, wherein the timing conveyor belt comprises two columns of stop members aligned along the longitudinal direction of the timing conveyor belt, such that the positions of two columns of objects can be controlled with the timing conveyor belt.

8. The system of claim 7, wherein the stop members of the two columns are positioned on the timing conveyor belt so as to be staggered relative to each other along the longitudinal direction of the timing conveyor belt, such that objects in the two columns can be positioned out-of-phase relative to each other along the longitudinal direction of the time conveyor belt.

9. The system of claim 7, wherein the stop members of each column are equally spaced along the longitudinal direction of the timing conveyor belt.

10. The system of claim 1, further comprising a singulating section adapted to receive the columns of objects from the timing section, direct the objects laterally into a single column, and convey the single column of objects along a longitudinal direction of the singulating section.

11. A method for controlling conveyed objects, the method comprising:
    conveying objects in parallel columns to a timing section;
    controlling the positions of the objects within each column along a longitudinal direction of the timing section such that the objects of one column are out-of-phase relative to the objects of the another column, the controlling comprising driving the objects of each column forward along a timing conveyor belt toward stop members positioned at predetermined positions along a length of the timing conveyor belt, the stop members being adapted to halt further travel of the objects;
    conveying the columns of objects to a singulating section;
    combining the columns of objects into a single column with the singulating section; and
    conveying the objects in the single column to a subsequent processing section.

12. The method of claim 11, wherein driving the objects of each column comprises driving the objects of each column along separate timing conveyor belts each having a plurality of stop members.

13. The method of claim 12, wherein the stop members of one of the timing conveyor belts are staggered relative to the stop members of the other timing conveyor belt.

14. The method of claim 11, wherein driving the objects of each column comprises driving the objects of each column along a single timing conveyor belt having two columns of stop members.

15. The method of claim 14, wherein the stop members of one of the columns are staggered relative to the stop members of the other column.

16. The method of claim 11, wherein the stop members comprise friction pads upon which the objects come to rest.

17. The method of claim 11, wherein the stop members comprise flights against which the objects abut.

18. A timing conveyor belt comprising:

a top surface and a bottom surface;

a plurality of rollers mounted within cavities provided in the timing conveyor belt, the rollers extending beyond the top and bottom surfaces of the timing conveyor belt and being adapted to propel an object along the timing conveyor belt when the rollers contact a cam; and friction pads provided at predetermined positions along a length of the timing conveyor belt;

wherein objects propelled along the timing conveyor come to rest on the friction pads at the predetermined positions.

19. The conveyor belt of claim 18, wherein axes about which the rollers rotate are perpendicular to a length of the conveyor belt.

20. The conveyor belt of claim 18, wherein the friction pads are equally spaced from each other.

21. The conveyor belt of claim 18, wherein the friction pads are arranged in two staggered columns aligned along a length of the conveyor belt.

* * * * *